United States Patent
Iizuka (12)

(10) Patent No.: US 6,388,970 B1
(45) Date of Patent: May 14, 2002

(54) COMPENSATION FOR THERMAL EFFECTS IN CD WRITE STRATEGY

(75) Inventor: Jin Iizuka, Sunnyvale, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/728,319

(22) Filed: Nov. 30, 2000

(51) Int. Cl.$^7$ .................................................. G11B 7/00
(52) U.S. Cl. ..................... 369/59.12; 369/47.5; 369/116
(58) Field of Search ............................. 369/47.1, 47.12, 369/47.15, 47.5, 47.51, 53.1, 53.11, 53.2, 53.31, 53.34, 59.1, 59.11, 59.12, 116

(56) References Cited

U.S. PATENT DOCUMENTS

| | | | | |
|---|---|---|---|---|
| 5,631,887 A | * | 5/1997 | Hurst, Jr. | 369/47.53 |
| 5,696,747 A | * | 12/1997 | Bartholomeusz | 369/100 |
| 5,742,566 A | * | 4/1998 | Imai | 369/116 X |
| 6,188,658 B1 | * | 2/2001 | Saga et al. | 369/47.51 |

* cited by examiner

*Primary Examiner*—Muhammad Edun
(74) *Attorney, Agent, or Firm*—John F. Schipper

(57) ABSTRACT

Method and system for compensating for thermal effects in writing and reading of mark and space characters on a CD-R/RW disk. Character lengths are measured for character triples (preceding mark, preceding space, present mark) on a disk, and a difference ΔL between present mark length and a reference mark length is computed for each of a selected group of combinations of preceding mark lengths and preceding space lengths. Mean values of ΔL are computed for each of these combinations. These mean values are interpreted as estimates of the thermal effects for the disk. Where the number of values of ΔL, for a given combination of preceding mark lengths and preceding space lengths, used to determine a mean value of ΔL is less than a threshold number, a selected algorithm is used to provide an adjusted mean value. Variation of thermal effects with disk write speed is determined and used in accounting for thermal effects. Frequency response effects of mark and space lengths are removed.

18 Claims, 3 Drawing Sheets

COMPENSATION FOR THERMAL EFFECTS IN CD WRITE STRATEGY

FIELD OF THE INVENTION

This invention relates to compensation for thermal effects in mark and space lengths for compact disk write strategy.

BACKGROUND OF THE INVENTION

At present, analysis of thermal effects from adjacent marks and spaces, upon the lengths of marks written onto a compact disk (CD), requires use of special patterns and of special and complex equipment for such purposes. A CD-RW will manifest modest thermal effects, but a CD-R will manifest much greater thermal effects. Where a typical CD-R or CD-RW drive is used, it may be difficult or impossible to generate or analyze the special patterns needed. The present approaches may not allow account to be taken of variation of thermal effects with disk write speed and may require use of inflexible analytical models.

What is needed is another approach to analysis of thermal effects on lengths of marks written onto CD-R/RWs that does not require use of special patterns or complex equipment and that provides accurate statistical information on the extent of these thermal effects. Preferably, the approach should be flexible, should allow use of two or more methods to analyze these effects and should allow for variation of thermal effects with disk write speed. Preferably, the approach should provide this analysis in relatively short time for all of the mark and space patterns that can be reasonably expected to occur in CD-R/RW processing. Preferably, the approach should have a low associated disk error rate and should permit a statistical analysis of the data used to compensate for these thermal effects.

SUMMARY OF THE INVENTION

These needs are met by the invention, which provides a method of measurement and analysis of thermal effects for each of the permutations of adjacent marks and spaces that occur in writing to a CD-R or CD-R/RW medium. Thermal effects associated with each of Q combinations of lengths of adjacent marks and spaces ("characters") are measured, compared with reference data, and analyzed and presented in a format that can be directly used by a CD-R/RW processing device to automatically compensate for change in length of a mark due to the lengths of the adjacent mark and space characters. Here, Q is a measure of the number of legitimate combinations of lengths of adjacent characters associated with a particular mark length. Statistical data are developed from the analysis and are used to estimate expected CD error rates after compensation for thermal effects is included. Variation of thermal effects with disk write speed is also determined.

DESCRIPTION OF BEST MODES OF THE INVENTION

Figure 1:
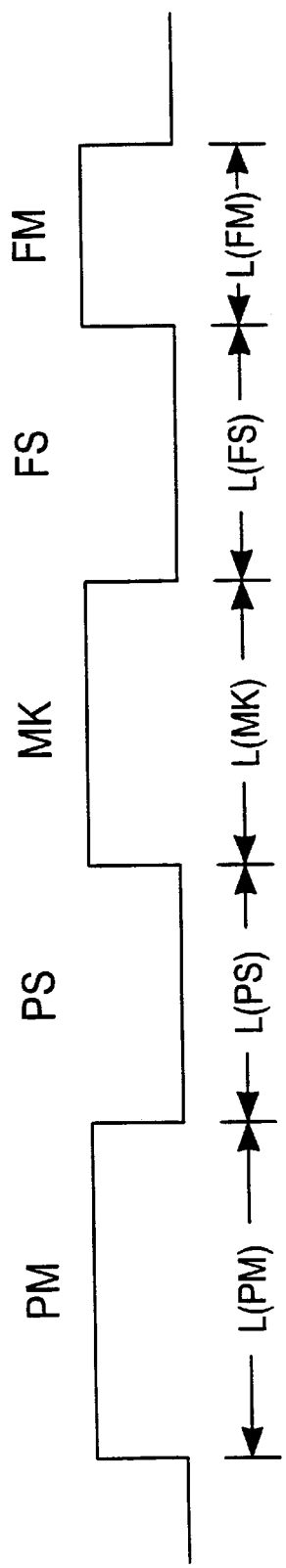
FIG. 1 illustrates a sequence of adjacent marks and spaces set down by a CD character writing device, such as a laser.

A character writing device, such as a highly focused laser beam is directed at a recording medium in a CD format to set down a sequence of CD-R/RW characters (marks and spaces), each having a preselected length, as indicated in FIG. 1. A preceding mark PM, a preceding space PS, a present mark MK a following space FS and a following mark FM represent five consecutive characters in the sequence, having the respective lengths L(PM), L(PS), L(MK), L(FS) and L(FM). Each mark character has a length L(M) in a selected range $L1 \cdot T \leq L(M) \leq L2 \cdot T$, and each space character has a length L(S) in a selected range $L3 \cdot T \leq L(S) \leq L4 \cdot T$, where each of L1, L2, L3 and L4 is a sum of a selected positive integer plus a fixed offset $\Delta O$, and T is a selected temporal or spatial length (e.g., T=0.1 nsec). In one embodiment, $L1=L3=3+\Delta O$ and $L2=L4=11+\Delta O$. A procedure for determination of $\Delta O$, L1, L2, L3 and L4 is discussed in the following.

In the absence of thermal effects, a present mark MK would have a selected reference length L0(MK), which is approximately equal to $m0 \cdot T$, where m0 is a positive integer plus offset $\Delta O$. Where thermal effects are present, the present mark will have a length L(MK) that is greater than L0(MK) and the difference depends upon one or more of L0(MK), L(PM), L(PS), L(FS) and L(FM) for the adjacent mark and space characters:

$$L(MK)=f1(L0(MK), L(PM), L(PS), L(FS), L(FM)), \quad (1)$$

where f1 is a suitable function of the indicated four variables. Dependence of the length L(MK) upon the character lengths L(FS) and L(FM) is relatively weak, and in a first embodiment these dependences are ignored:

$$L(MK)=f2(L0(MK), L(PM), L(PS)), \quad (2)$$

where f2 is a suitable function of the indicated two variables. In this embodiment, the mark length thermal differential $$\Delta L(MK)=L(MK)-L0(MK)=\Delta m \cdot T \quad (3)$$

depends upon L(PM), L(PS) and L0(MK), upon disk write speed and upon a frequency response correction. In an initial formulation, it is assumed that each of the character lengths L(PM)/T, L(PS)/T and L0(MK)/T is approximately a positive integer plus offset $\Delta O$, $$L(PM)/T=L1, L1+1, \ldots, L2, \quad (4A)$$

$$L(PS)/T=L3, L3+1, \ldots, L4,$$

$$L0(MK)/T=L1, L1+1, \ldots, L2 \quad (4B)$$

so that each of L(PM)/T and L0(MK)/T has L2−L1+1 separate values and L(PS)/T has L4−L3+1 separate values. In one formulation, $L1=L3=3+\Delta O$ and $L2=L4=11+\Delta O$. In this formulation, the quantity $\Delta L(MK)$ in Eq. (3) depends upon the reference mark length L0(MK) and upon Q value triples $$(m0, m1, m2)=(L0(MK)/T, L(PM)/T, L(PS)/T), \quad (5)$$

where $Q=(L2-L1+1)^2(L4-L3+1)$ is the number of combinations of these triples.

Figure 2:
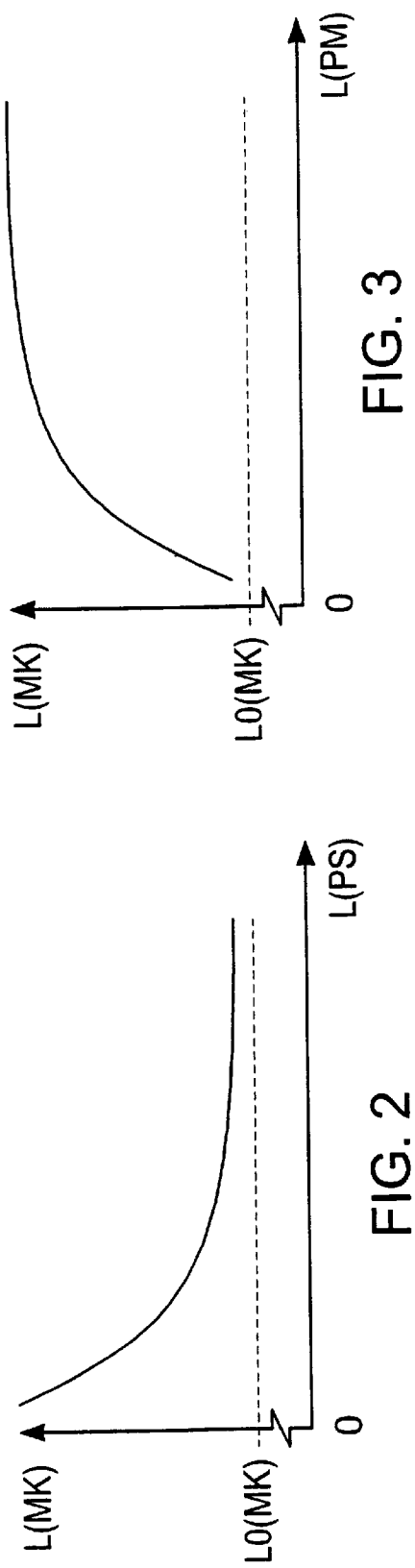

FIG. 2 illustrates, graphically and approximately, variation of present mark length L(MK) with the preceding space length L(PS), for a fixed preceding mark length L(PM). For fixed preceding mark length L(PM), the present mark length L(MK) decreases toward its "true" value L0(MK) as the preceding space length L(PS) increases, reflecting the fact that the influence of spillover thermal effects from the preceding mark length L(PM) become less and less.

Figure 3:
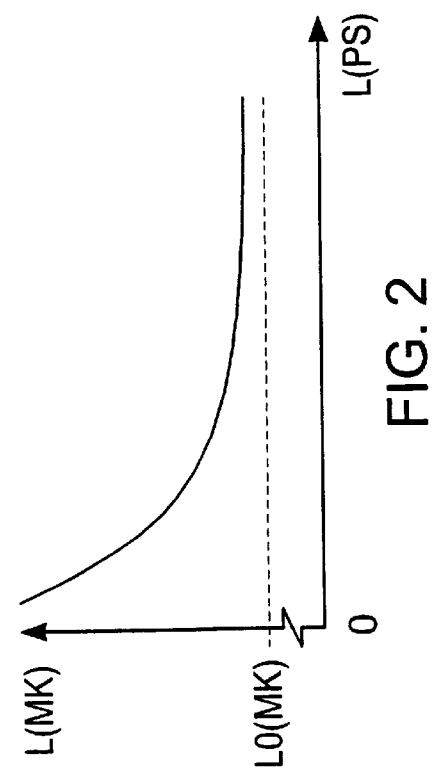
FIGS. 2 and 3 are graphical views illustrating variation of present mark length L(MK) with the length of a preceding space L(PS) and the length of a preceding mark L(PM), respectively.

FIG. 3 illustrates, graphically and approximately, variation of present mark length L(MK) with the preceding mark length L(PM), for a fixed preceding space length L(PS). For fixed preceding space length L(PS), the present mark length L(MK) increases above its "true" value L0(MK) as the preceding mark length L(PM) increases, reflecting the fact that the influence of spillover thermal effects from the preceding mark length L(PM) become greater and greater. In some situations, the effect of variable preceding space length L(PS) on the present mark length L(MK) is greater than the corresponding effect of preceding mark length L(PM) on the present mark length L(MK). In other situations, the reverse is true.

Figure 4A:
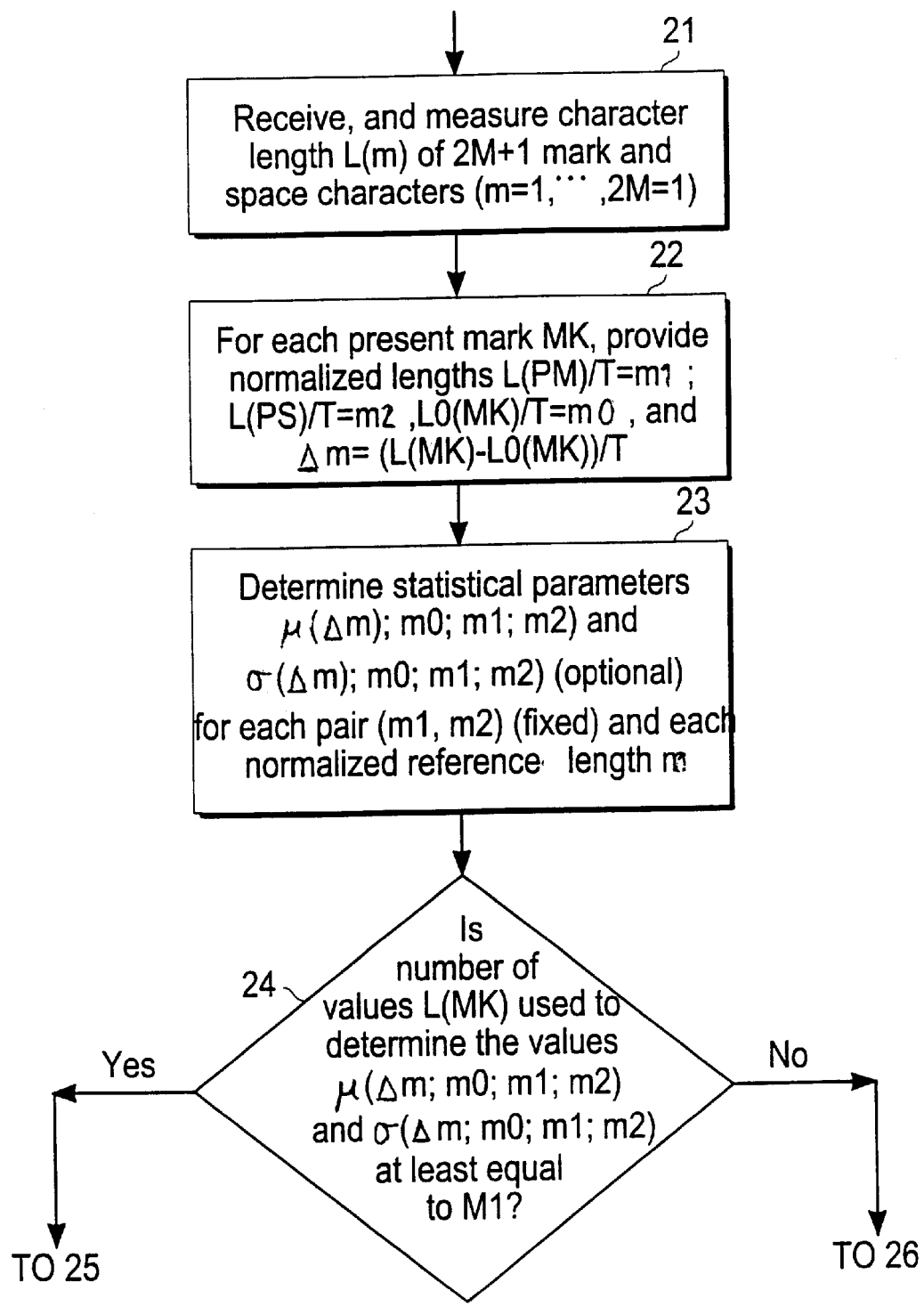
FIG. 4 is a flow chart of a procedure suitable for practicing the invention.
Figure 4B:
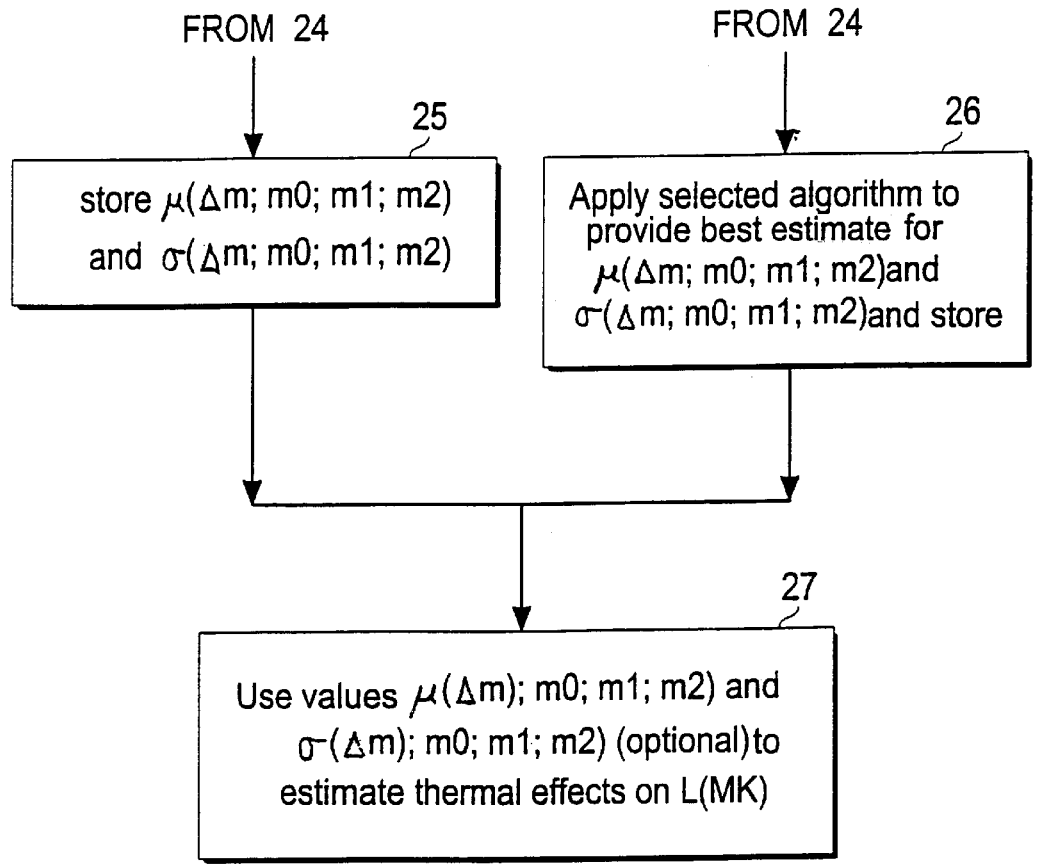

FIG. 4 is a flow chart illustrating a procedure for practicing the invention. In step 21, the system receives and measures the character length L(m) of, 2M (or 2M+1) alternating mark and space characters, numbered m=1, 2, . . . , where M is a selected large number, preferably in a range 10,000≦M≦60,000, using an approach discussed in the following. Approximately 50 percent of these characters are marks, and the remainder are spaces. In step 22, for each present mark MK, the system provides a triple of normalized lengths, (m1=L(PM)/T, m2=L(PS)/T, L(MK)/T), expressed in units of T, of the immediately preceding mark and immediately preceding space and provides a normalized reference length m0=L0(MK)/T=[L(MK)/T]$_{int}$+ΔO of the present mark that would be measured in the absence of thermal effects. Here, [x]$_{int}$ is the integer part of the real number x. Approximately M of these triples are filtered into the different groups of normalized lengths (m0, m1, m2) using any convenient numerical filtering procedure, such as EXCEL.

In step 23, for each of the (L2−L1+1) estimates of m0=L0(MK)/T, the system collects the corresponding pairs of values {(m1,m2)} and determines the mean values μ(Δm;m0;m1;m2) and standard deviations σ(Δm;m0;m1;m2) (optional) for each of the Q triples of values (m0,m1,m2). Thus, for each estimate m0=L0(MK), the system determines a first matrix μ(Δm;m0;m1;m2) and a second matrix σ(Δm;m0;m1;m2), where L1≦m0≦L2, L1≦m1≦L2 and L3≦m2≦L4.

In step 24, for each matrix value μ(Δm;m0;m1;m2) and each (optional) matrix value σ(Δm;m0;m1;m2) (m0, m1 and m2 fixed), the system determines if these statistical values have been calculated using at least M1 measured values ΔL(MK) for a fixed combination of values (m0,m1,m2), where M1 is a selected positive integer (e.g., M1=10 or M1=20), from the collection of 2M (or 2M+1) individual character length values L(PM) and L(PS). If the answer to the query in step 24 is "yes", the system accepts and stores the matrix values μ(Δm;m0;m1;m2) and σ(Δm;m0;m1;m2) (m0, m1 and m2 fixed), in step 25, and moves to step 27. If the answer to the query in step 24 is "no", the system applies a selected algorithm, in step 26, to provide and store "best estimates" of the statistical parameters μ(Δm;m0;m1;m2) and σ(Δm;m0;m1;m2) (m0, m1 and m2 fixed), and moves to step 27. In step 27, the system uses the matrices {μ(Δm;m0;m1;m2)} and {σ(Δm;m0;m1;m2)} (optional), for each of the L2−L1+1 values of the reference length m0=L0(MK)/T, to estimate and compensate for thermal effects. This compensation may be implemented by adjusting a clock frequency corresponding to particular mark and space sequences.

In a first selected algorithm, used in step 26 in FIG. 4, the system selects a subset of values $\{\mu(\Delta m;m0;m1_k;m2_k)\}_k$ (1≦k≦K; K≧2), where each mean value in the subset is based on at least M1 measurements ΔL(MK), and forms an adjusted mean value as a convex combination $$\mu'(\Delta m; m0; m1; m2) = \sum_{k=1}^{K} w_k \cdot \mu(\Delta m; m0; m1_k; m2_k) \quad (6)$$

where the coefficients $w_k$ are selected non-negative weights satisfying $$\sum_{k=1}^{K} w_k = 1. \quad (7)$$

In a similar manner, an adjusted value σ'(Δm;m0;m1;m2)} (optional) is computed. One suitable choice of weights is $w_1=1$, $w_k=0$ (2≦k≦K). Another suitable choice is $w_k=1/K1$ (1≦k≦K1), $w_k=0$ (K1+1≦k), where K1 is a selected integer satisfying 1≦K1≦K. One can form an adjusted standard deviation value σ'(Δm;m0;m1;m2) in a similar manner.

In a second selected algorithm, used in step 26 of FIG. 4, the system selects a subset of two or more values $\mu(j)=\mu(\Delta m;m0;m1_j;m2_j)$ (j=1, 2, . . . , J; J≧2) (m1−j and m2−j fixed), where the mean value $\mu(\Delta m;m0;m1_j;m2_j;)$ for each such combination $(m0;m1_j,m2_j)$ is based on at least M1 values of Δm=ΔL(MK)/T and each of the length pairs $(m1_j;m2_j)$ is close to or adjacent to a length pair $(m1_0,m2_0)$ of interest, for which fewer than M1 values {μ(Δm;m0;m1$_0$;m2$_0$)} are available for computation. The (approximately) integer values m1−j and m2−j correspond to x- and y-coordinate values, respectively, in a Cartesian system. The values $\mu(\Delta m;m0;m1_j;m2_j)$ in the subset are approximated as a polynomial P(x;y;m0) of degree at least 1 in each of the variables x and y, and the polynomial coefficients are chosen so that $P(x=m1_j,y=m2_j;m0=\mu(\Delta m;m0;m1-j;m2-j)$. Here, M1 is a selected small number, such as M1=10 or 20. For the choice J=3, for example, the reference parameters of interest, $\mu(j)=\mu(\Delta m;m0;m1_j;m2_j)$, are approximated as a mixed polynomial $$\mu(\Delta m;m0;m1_j;m2_j)=P(xj;yj;m0)=A\cdot xj+B\cdot yj+C\cdot (xj)\cdot (yj), \quad (8)$$

$$(xj,yj)=(m1_j,m2_j), \quad (9)$$

where the coefficients A, B and C are the same for all three of the integer pairs $(m1_j,m2_j)$. It is assumed here that the three integer pairs $(m1_j,m2_j)$ are not collinear. The three coefficients A, B and C are determined by the matrix relation $$\begin{bmatrix} x1 & y1 & x1\cdot y1 \\ x2 & y2 & x2\cdot y2 \\ x2 & y3 & x3\cdot y3 \end{bmatrix} \begin{bmatrix} A \\ B \\ C \end{bmatrix} = \begin{bmatrix} \mu(1) \\ \mu(2) \\ \mu(3) \end{bmatrix} \quad (10)$$

which has a unique, non-singular solution if the three integer pairs (xj,yj) are not collinear. The statistical parameter μ(Δm;m0;m10;m20) is then approximated as an adjusted mean value $$\mu'(\Delta m;m0;m1_0;m2_0)=A\cdot m1_0+B\cdot m2_0+C\cdot (m1_0)\cdot (m2_0), \quad (11)$$

and a similar approximation is used for the (optional) standard deviation parameter σ(Δm;m0;m1$_0$;m2$_0$). These approximations are used to estimate the thermal effect(s) ΔL(MK) for the respective preceding mark and preceding space lengths m1 and m2, relative to the ideal present mark length L0(MK).

Another choice of polynomial, corresponding to J=4, is $$\mu(\Delta m;m0;m1_j;m2_j)=P(xj;yj;m0)=D\cdot xj+E\cdot yj+F\cdot (xj)\cdot (yj)+G\cdot (x_j)^2, \quad (12)$$

This polynomial may be suitable where the preceding mark length L(PM) is believed to gave a greater effect on the thermal effect manifested by the present mark length L(MK) than does the preceding space length L(PS). The coefficients D, E, F and G are determined from the matrix relation $$\begin{bmatrix} x1 & y1 & x1 \cdot y1 & (x1)^2 \\ x2 & y2 & x2 \cdot y2 & (x2)^2 \\ x3 & y3 & x3 \cdot y3 & (x3)^2 \\ x4 & y4 & x4 \cdot y4 & (x4)^2 \end{bmatrix} \begin{bmatrix} D \\ E \\ F \\ G \end{bmatrix} = \begin{bmatrix} \mu(1) \\ \mu(2) \\ \mu(3) \\ \mu(4) \end{bmatrix}, \quad (13)$$

which has a unique, non-singular solution if no three integer pairs (xj,yj) are collinear. The statistical parameter $\mu(\Delta m;m0;m1_0;m2_0)$ is then approximated as an adjusted mean value $$\mu'(\Delta m;m0;m1_0;m2_0)=D \cdot m1_0+E \cdot m2_0+F \cdot (m1_0) \cdot (m2_0)+G \cdot (m1_0)^2 \quad (14)$$

For the choice J=5, the parameters of interest, $\mu(j)=\mu(\Delta m;m0;m1_j;m2_j)$ are approximated as $$\mu(\Delta m;m0;m1-j;m2_j)=P(xj,yj;m0)=V \cdot xj+W \cdot yj+X \cdot (xj) \cdot (yj)+Y \cdot (xj)^2+Z \cdot (yj)^2. \quad (15)$$

The coefficients V, W, X, Y and Z are determined from the matrix relation $$\begin{bmatrix} x1 & y1 & x1 \cdot y1 & (x1)^2 & (y1)^2 \\ x2 & y2 & x2 \cdot y2 & (x2)^2 & (y2)^2 \\ x3 & y3 & x3 \cdot y3 & (x3)^2 & (y3)^2 \\ x4 & y4 & x4 \cdot y4 & (x4)^2 & (y4)^2 \\ x5 & y5 & x5 \cdot y5 & (x5)^2 & (y5)^2 \end{bmatrix} \begin{bmatrix} V \\ W \\ X \\ Y \\ Z \end{bmatrix} = \begin{bmatrix} \mu(1) \\ \mu(2) \\ \mu(3) \\ \mu(4) \\ \mu(5) \end{bmatrix}, \quad (16)$$

which has a unique, non-singular solution if no three integer pairs (xj,yj) are collinear. The statistical parameter $\mu(\Delta m;m0;m1_0;m2_0)$ is then approximated as an adjusted mean value $$\mu'(\Delta m;m0;m1_0;m2_0)=V \cdot m1_0+W \cdot m2_0+X \cdot (m1_0) \cdot (m2_0)+Y \cdot (m1_0)^2+Z \cdot (m2_0)^2. \quad (17)$$

A similar approximation is used for the (optional) standard deviation parameter $\sigma'(\Delta m;m0;m1_0;m2_0)$. Any integer number $J \geq 2$ of observed values $\mu(j)$ can be used here with this formalism.

As disk write speed is increased, the optical power of the character writing device must be increased correspondingly. Increasing the optical power used for writing will increase the measure of thermal effects $\Delta L(MK)$ defined in Eq. (3). Preferably, the procedure set forth in FIG. 4, including use of the selected algorithm, is performed and used for compensation for each distinct value of disk write speed.

A suitable count of the number of preceding mark lengths L(PM), preceding space lengths L(PS) and present mark lengths L(MK) may be implemented as follows. For a given value of the length unit T, each of the mark and space bins with lengths L satisfying $$(L1+k) \cdot T \leq L < (L1+k+1) \cdot T \ (k=0, 1, 2, \ldots, L2-L1-1), \quad (18A)$$

$$(L3+k) \cdot T \leq L < (L3+k+1) \cdot T \ (k=0, 1, 2, \ldots, L4-L3-1), \quad (18B)$$

respectively, is subdivided into a selected number b of sub-bins (e.g., b=9–12) with approximately constant sub-bin length. A sample of M mark lengths (or M space lengths) is provided, where M is a large number, such as $10,000 \leq M \leq 60,000$, and each mark length (or space length) is deposited into a sub-bin corresponding to that value of mark length (or space length). Each sub-bin is tagged with the number n of mark lengths (or space lengths) in that sub-bin. This number n will not be uniform across a group of sub-bins representing one of the mark length (or space length) bins, but will resemble a binomial or normal distribution.

Table 1 illustrates the number of mark lengths in nine bins, each including 9–12 sub-bins. A boundary between two adjacent bins (e.g., between bins defined by $(L1+k) \cdot T \leq L < (L1+k+1) \cdot T$ and $(L1+k+1) \cdot T \leq L < (L1+k+2) \cdot T$, is assumed to be indicated by a sub-bin that has a smaller number n than the number n for each of the two adjacent sub-bins. For the example shown in Table 1, the sub-bins corresponding to the nominal sub-bin sizes 3.445E-07, 4.705E-07, 5.86E-07, 7.015E-07, 8.17E-07, 9.325E-07, 1.04E-06 and 1.164E-06, with corresponding sub-bin numbers n=4, 1, 1, 1, 1, 0, 0, 0, respectively, would be taken to define the bin boundaries for the respective bins set forth in Eq. (18). These nine bins include 9–12 sub-bins, respectively. Note that these four bins have the respective sizes 0.945E-07, 1.155E-07, 1.155E-07 and 1.155E-07, 1.115E-07, 1.115E-07, 1.115E-07, 1.115E-07 and (incomplete), which are substantially constant except for the left-most bin and the right-most bin locations. The total number of mark lengths within each bin is not constant.

In this example, the bin length T may be taken to be approximately 1.115E-07, but the bin boundaries need not coincide precisely with integer values. For example, for the sub-bin configuration shown in Table 1 the bin boundaries correspond to 3.22·T, 4.22·T, 5.22·T, 6.22·T, 7.22·T, 8.22·T, 9.22·T, 10.22·T, and 11.22·T, not to integer multiples of T. The offset for this example is $\Delta O=0.22 \cdot T$. This approach to identification of bin boundaries has the advantage that these boundaries will coincide with sub-bin locations at which the sub-bin numbers are smallest. Treatment of the space length bins is analogous.

TABLE 1

Mark Length Sub-Bin Populations.

| Sub-Bin Edge | Sub-Bin Number |
|---|---|
| 2.605E-07 | 39 |
| 2.71E-07 | 135 |
| 281.5E-07 | 268 |
| 2.92E-07 | 467 |
| 3.025E-07 | 513 |
| 3.13E-07 | 343 |
| 3.235E-07 | 185 |
| 3.34E-07 | 38 |
| 3.445E-07 | 4 |
| 3.55E.07 | 9 |
| 3.655E-07 | 76 |
| 3.76E-07 | 177 |
| 3.865E-07 | 424 |
| 3.97E-07 | 531 |
| 4.075E-07 | 464 |
| 4.18E-07 | 378 |
| 4.285E-07 | 225 |
| 4.39E-07 | 116 |
| 4.495E-07 | 39 |
| 4.6E-07 | 4 |
| 4.705E-07 | 1 |
| 4.81E-07 | 22 |
| 4.915E-07 | 57 |
| 5.02E-07 | 167 |
| 5.125E-07 | 275 |
| 5.23E-07 | 321 |

TABLE 1-continued

Mark Length Sub-Bin Populations.

| Sub-Bin Edge | Sub-Bin Number |
|---|---|
| 5.335E-07 | 350 |
| 5.44E-07 | 242 |
| 5.545E-07 | 139 |
| 5.65E-07 | 48 |
| 5.755E-07 | 7 |
| 5.86E-07 | 1 |
| 5.965E-07 | 5 |
| 6.07E-07 | 35 |
| 6.175E-07 | 99 |
| 6.28E-07 | 182 |
| 6.385E-07 | 240 |
| 6.49E-07 | 229 |
| 6.595E-07 | 166 |
| 6.7E-07 | 100 |
| 6.805E-07 | 43 |
| 6.91E-07 | 9 |
| 7.015E-07 | 1 |
| 7.12E-07 | 3 |
| 7.225E-07 | 10 |
| 7.33E-07 | 53 |
| 7.435E-07 | 119 |
| 7.54E-07 | 156 |
| 7.645E-07 | 176 |
| 7.75E-07 | 158 |
| 7.855E-07 | 94 |
| 7.96E-07 | 44 |
| 8.065E-07 | 13 |
| 8.17E-07 | 1 |
| 8.275E-07 | 2 |
| 8.38E-07 | 11 |
| 8.485E-07 | 26 |
| 8.59E-07 | 67 |
| 8.695E-07 | 120 |
| 8.8E-07 | 112 |
| 8.905E-07 | 95 |
| 9.01E-07 | 49 |
| 9.115E-07 | 13 |
| 9.22E-07 | 4 |
| 9.325E-07 | 1 |
| 9.43E-07 | 0 |
| 9.535E-07 | 9 |
| 9.64E-07 | 17 |
| 9.745E-07 | 45 |
| 9.85E-07 | 80 |
| 9.955E-07 | 87 |
| 1.006E-06 | 86 |
| 1.017E-06 | 35 |
| 1.027E-06 | 14 |
| 1.038E-06 | 6 |
| 1.048E-06 | 0 |
| 1.059E-06 | 2 |
| 1.069E-06 | 8 |
| 1.08E-06 | 10 |
| 1.09E-06 | 49 |
| 1.101E-06 | 72 |
| 1.111E-06 | 73 |
| 1.122E-06 | 56 |
| 1.132E-06 | 36 |
| 1.143E-06 | 8 |
| 1.153E-06 | 1 |
| 1.164E-06 | 0 |
| 1.174E-06 | 0 |
| 1.185E-06 | 2 |
| 1.195E-06 | 17 |

Figure 5:
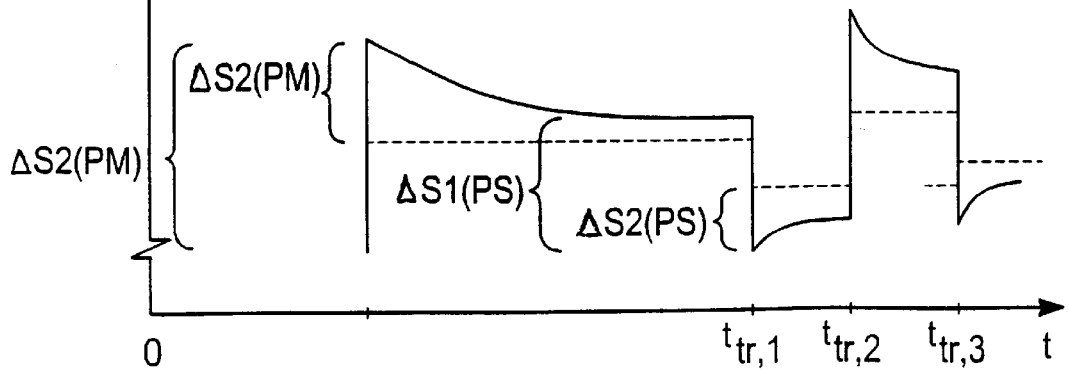
FIG. 5 illustrates frequency response effects on mark and space lengths.

The total variation of mark length L(MK) is affected by thermal effects, by disk speed and by a phenomenon referred to as "frequency response" ("FR"). Frequency response depends upon the relative lengths, L(PM), L(PS) and L(MK), of consecutive marks and spaces encountered in a track and is illustrated in FIG. 5. A signal is processed by a system including a high pass filter. Signal processing by this high pass filter will provide a sharp (step function) transition from one discrete value to a higher discrete value (e.g., mark) but will cause the signal value immediately after the transition to decrease or "droop" approximately exponentially to a lower value. The rate of decay depends upon a time constant $\tau$ associated with the high pass filter. This droop will also occur in the opposite direction where the signal value transitions to a lower discrete value (e.g., space), with the same droop time constant $\tau$, as illustrated in FIG. 5.

Consider a mark of length L(PM) and a subsequent transition to a space, as illustrated in FIG. 5. Expressed as a function of time, the signal value after the transition point ($t=t_{tr,1}$) and before another transition occurs is approximately $$s(t;PS) \approx \Delta s1(PS) + \Delta s2(PS).\exp\{-(t-t_{tr,1})/\tau\}, \quad (19)$$

where $\Delta s1(PS)$ and $\Delta s2(PS)$ are value increments shown in FIG. 5 and associated with the preceding transition from a mark to a space. If a transition from a space to a mark of length L(MK) next occurs, at a time $t=t_{tr,2}$, the signal value after this second transition occurs and before a third transition occurs will be approximately $$s(t;MK) \approx \Delta s1(t_{PS}) + \Delta s2(t_{PS}).\exp\{-(t_{tr,2}-t_{tr,1})/\tau\} + \Delta s1(t_{MK}) + \Delta s2(t_{MK}).\exp\{-(t-t_{tr,2})/\tau\}, \quad (20)$$

where $\Delta s1(MK)$ and $\Delta s2(MK)$ are value increments shown in FIG. 5 and associated with the preceding transition from a space to a mark. The signal value s(t;MK) after the second transition will depend upon the time difference, $\Delta t(2,1)=t_{tr,2}-t_{tr,1}$, for the preceding two transitions so that the length $L(PS)=\Delta t(2,1)$ of the space after the first transition ($t=t_{tr,1}$) will partly determine the maximum and minimum values of the signal s(t;MK) after the second transition. In a similar manner, the length L(MK) of the preceding mark will partly determine the maximum and minimum values of the signal s(t;FS) after the next transition to a space.

This dependence upon transition time differences, such as $\Delta t(2,1)=t_{tr,2}-t_{tr,1}$, gives rise to a frequency response (FR) effect in the signal value, depending upon the transition time differences for a consecutive sequence of mark-to-space and space-to-mark transitions. A mark length L(MK) may be represented more completely as $$L(MK) = L0(MK) + TE + FR, \quad (21)$$

where TE and FR refer to the thermal effect and the frequency response effect, respectively, upon mark length. A reference disk will have a corresponding reference mark length of $$L(MK;\text{ref}) = L0(MK) + FR, \quad (22)$$

where the thermal effect TE has been largely or wholly compensated for in this reference mark length. The difference of the uncompensated and reference mark lengths becomes $$L(MK) - L(MK;\text{ref}) = TE = \Delta L(MK), \quad (23)$$

where $\Delta L(MK)$ is the mark length thermal differential defined in Eq. (3). In the mark length thermal differential, defined in Eq. (3), the effects of frequency response upon mark length and space length are absent.

What is claimed is:

1. A method for compensating for thermal effects in mark lengths on a compact disk, the method comprising:
   providing a sequence of alternating mark and space characters formed on a CD-R/RW disk;

measuring the lengths of selected consecutive triples of characters of a preceding mark, a preceding space and a present mark, denoted as L(PM), L(PS) and L(MK), respectively;

computing a difference $\Delta m = \Delta L(MK)/T$ between the length L(MK)/T and a reference length L0(MK)T=m0 for each of a selected sequence of combinations of the lengths m0, L(PM)/T=m1 and L(PS)/T=m2, and computing a mean value $\mu(\Delta m; m0; m1; m2)$ of the difference for each of the sequence of combinations, where T is a selected length value;

determining the number p of length measurements L(MK) used to determine the value $\mu(\Delta m; m0; m1; m2)$ for at least one combination of said lengths m0, m1 and m2;

when p is at least equal to a selected positive integer M1, accepting and storing said value $\mu(\Delta m; m0; m1; m2)$ as an estimate of thermal effects of character writing length for the at least one combination; and when p is less than M1, using a selected algorithm to determine an adjusted value $\mu'(\Delta m; m0; m1; m2)$, and accepting and storing said value $\mu'(\Delta m; m0; m1; m2)$ as an estimate of thermal effects of character writing length for the at least one combination.

2. The method of claim 1, further comprising using said mean value $\mu(\Delta m; m0; m1; m2)$ for at least one of said combinations to compensate for said thermal effects for the at least one of said combinations in reading said characters formed on said CD-R/RW disk.

3. The method of claim 1, further comprising computing said mean value $\mu(\Delta m; m0; m1; m2)$ for each of at least two different disk write speeds at which said characters are written onto said disk.

4. The method of claim 1, further comprising selecting said algorithm to comprise:

choosing said adjusted value $\mu'(\Delta m; m0; m1; m2)$ to be a convex sum of a selected number of values $\mu(\Delta m; m0; m1'; m2')$, for combinations (m0,m1',m2') for each of which said number m is at least equal to said number M1 with said same value m0.

5. The method of claim 1, further comprising selecting said algorithm to comprise:

for a selected number of said mean values $\mu(\Delta m; m0; m1'; m2')$, for combinations (m0,m1',m2') for each of which said number m is at least equal to said number M1, with said same value m0, approximating said selected mean values as a polynomial P(m0;m1';m2') of degree at least equal to 1 in each of said variables m1' and m2'; and computing said adjusted value as $\mu'(\Delta m; m0; m1; m2) = P(m0; m1'=m1; m2'=m2)$.

6. The method of claim 1, wherein said process of measuring said lengths of said characters comprises:

providing a sequence of at least two sub-bins, each having an associated character length of approximately T/K, where K is a selected positive integer, where each sub-bin has a range of character lengths that does not overlap character lengths in another sub-bin and each value of a character length belongs to a sub-bin;

measuring a length of each of a selected set of characters and assigning the character length to the sub-bin with the corresponding character length range;

identifying a subset of bins, each of which satisfies the following condition: the number of character lengths in the identified sub-bin is less than the number of character lengths in each sub-bin that is adjacent to the identified sub-bin; and designating all sub-bins between two consecutive identified sub-bins as belonging to a corresponding bin of character lengths.

7. The method of claim 6, further comprising associating all measured character lengths within one of said bins with a representative character length.

8. The method of claim 6, further comprising choosing as said lengths of said selected set of characters a set of mark lengths.

9. The method of claim 6, further comprising choosing as said lengths of said selected set of characters a set of space lengths.

10. A system for compensating for thermal effects in mark lengths on a compact disk, the system comprising a computer that is programmed:

to provide a sequence of alternating mark and space characters formed on a CD-R/RW disk;

to measure the lengths of selected consecutive triples of characters of a preceding mark, a preceding space and a present mark, denoted as L(PM), L(PS) and L(MK), respectively;

to compute a difference $\Delta m = \Delta L(MK)/T$ between the length L(MK)/T and a reference length L0(MK)/T=m0 for each of a selected sequence of combinations of the lengths m0, L(PM)/T=m1 and L(PS)/T=m2, and computing a mean value $\mu(\Delta m; m0; m1; m2)$ of the difference for each of the sequence of combinations, where T is a selected length value;

to determine the number p of length measurements L(MK) used to determine the value $\mu(\Delta m; m0; m1; m2)$ for at least one combination of said lengths m0, m1 and m2;

when p is at least equal to a selected positive integer M1, to accept and store said value $\mu(\Delta m; m0; m1; m2)$ as an estimate of thermal effects of character writing length for the at least one combination; and when p is less than M1, to use a selected algorithm to determine an adjusted value $\mu'(\Delta m; m0; m1; m2)$, and to accept and store said value $\mu'(\Delta m; m0; m1; m2)$ as an estimate of thermal effects of character writing length for the at least one combination.

11. The system of claim 10, wherein said computer is further programmed to use said mean value $\mu(\Delta m; m0; m1; m2)$ for at least one of said combinations to compensate for said thermal effects for the at least one of said combinations in reading said characters formed on said CD-R/RW disk.

12. The system of claim 10, wherein said computer is further programmed to compute said mean value $\mu(\Delta m; m0; m1; m2)$ for each of at least two different disk write speeds at which said characters are written onto said disk.

13. The system of claim 10, wherein said computer is further programmed to select said algorithm to comprise:

choosing said adjusted value $\mu'(\Delta m; m0; m1; m2)$ to be a convex sum of a selected number of values $\mu(\Delta m; m0; m1'; m2')$, for combinations (m0,m1',m2') for each of which said number m is at least equal to said number M1 with said same value m0.

14. The system of claim 10, wherein said computer is further programmed to select said algorithm to comprise:

for a selected number of said mean values $\mu(\Delta m; m0; m1'; m2')$, for combinations (m0,m1',m2') for each of which said number m is at least equal to said number M1, with said same value m0, approximating said selected mean values as a polynomial P(m0;m1';m2') of degree at least equal to 1 in each of said variables m1' and m2'; and computing said adjusted value as $\mu'(\Delta m;m0;m1;m2)=P(m0;m1'=m1;m2'=m2)$.

15. The system of claim 10, wherein said computer is further programmed to measure said lengths of said characters by a process comprising:

provniding a sequence of at least two sub-bins, each having an associated character length of approximately T/K, where K is a selected positive integer, where each sub-bin has a range of character lengths that does not overlap character lengths in another sub-bin and each value of a character length belongs to a sub-bin;

measuring a length of each of a selected set of characters and assigning the character length to the sub-bin with the corresponding character length range;

identifying a subset of bins, each of which satisfies the following condition: the number of character lengths in the identified sub-bin is less than the number of character lengths in each sub-bin that is adjacent to the identified sub-bin; and designating all sub-bins between two consecutive identified sub-bins as belonging to a corresponding bin of character lengths.

16. The system of claim 15, wherein said computer is further programmed to associate all measured character lengths within one of said bins with a representative character length.

17. The system of claim 15, wherein said computer is further programmed to choose as said lengths of said selected set of characters a set of mark lengths.

18. The system of claim 15, wherein said computer is further programmed to choose as said lengths of said selected set of characters a set of space lengths.

* * * * *